US012789592B2

(12) United States Patent
Isings et al.

(10) Patent No.: US 12,789,592 B2
(45) Date of Patent: Nov. 10, 2026

(54) WINDOW ASSEMBLY AND VEHICLE

(71) Applicant: Honda Motor Co., Ltd., Tokyo (JP)

(72) Inventors: Connor Isings, Columbus, OH (US); Timothy J. Rupp, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 211 days.

(21) Appl. No.: 18/926,974

(22) Filed: Oct. 25, 2024

(65) Prior Publication Data

US 2026/0116158 A1 Apr. 30, 2026

(51) Int. Cl.

*B60J 1/00* (2006.01)
*B60J 1/10* (2006.01)
*B60J 10/777* (2016.01)
*B60R 13/06* (2006.01)

(52) U.S. Cl.

CPC ................ *B60J 1/007* (2013.01); *B60J 1/10* (2013.01); *B60J 10/777* (2016.02); *B60R 13/06* (2013.01)

(58) Field of Classification Search

CPC ... B60J 1/007; B60J 1/10; B60J 10/777; B60J 10/7775; B60R 13/0243; B60R 13/025; B60R 13/04; B60R 13/06

USPC ............................ 296/84.1, 93, 1.08, 146.15

See application file for complete search history.

(56) References Cited

U.S. PATENT DOCUMENTS 5,352,010 A 10/1994 Brodie et al.
5,396,746 A * 3/1995 Whitmer .................. B60J 10/70 52/204.597
5,451,090 A * 9/1995 Brodie .................... B60R 13/04 296/192
6,220,650 B1 4/2001 Davis et al.
6,722,731 B2 * 4/2004 Cornils ...................... B60J 1/02 296/146.15
7,641,265 B2 1/2010 Seiple et al.
7,644,975 B2 * 1/2010 Ryan ....................... B60R 13/04 24/297
9,259,994 B2 * 2/2016 Erner ....................... B60J 1/004
10,625,576 B2 * 4/2020 Kuster .............. B32B 17/10036
10,807,445 B2 10/2020 Tooker et al.

(Continued)

FOREIGN PATENT DOCUMENTS

CN 221137548 U 6/2024
DE 2855050 C3 6/1995

(Continued)

*Primary Examiner* — Gregory A Blankenship

(74) *Attorney, Agent, or Firm* — Morgan Lincoln; American Honda Motor Co., Inc.

(57) ABSTRACT

A window assembly for a vehicle having a body panel is disclosed. The window assembly comprises at least one panel supported on the body panel of the vehicle and comprising a peripheral edge. The window assembly further comprises a garnish supported on the body panel. The garnish comprises an outer surface, an inner surface opposite to the outer surface, a peripheral surface between the inner surface and the outer surface, and at least one engagement structure extending from the inner surface in a direction opposite to the outer surface. The garnish is disposed adjacent to the at least one panel, such that the garnish and (Continued)

LINE B-B the at least one panel lie in a same plane and together define a gap therebetween. The window assembly further comprises an encapsulation disposed at least partially between the at least one panel and the garnish to cover the gap therebetween.

15 Claims, 4 Drawing Sheets

(56) References Cited

U.S. PATENT DOCUMENTS

2004/0194390 A1* 10/2004 Ishikawa .................. B60J 10/84 49/352
2008/0093884 A1* 4/2008 Kurokawa ................. B60J 1/10 296/146.15
2011/0241370 A1* 10/2011 Alvarez .................. B60R 13/04 49/500.1
2012/0205940 A1* 8/2012 Sitterlet ................... B60J 10/30 29/527.1
2014/0145463 A1* 5/2014 Takayama ................ B60J 10/20 156/295
2014/0327267 A1* 11/2014 Deussen .................. B60J 10/70 296/93
2016/0121701 A1* 5/2016 Yoshida ................... B60J 1/006 49/372
2019/0077230 A1* 3/2019 Tallent ..................... B60J 1/007
2020/0180405 A1* 6/2020 Blottiau ................... B60J 1/007
2021/0178867 A1* 6/2021 Fukatami ............... B60J 5/0402
2021/0284099 A1* 9/2021 Uehata ................. H01Q 1/3283
2022/0072936 A1* 3/2022 Hatta ......................... B60J 1/10
2022/0152892 A1* 5/2022 Takahashi ........... B29C 44/1271
2022/0355654 A1* 11/2022 Baratin ............... B60R 13/0243
2023/0294497 A1 9/2023 Takahashi et al.
2023/0321956 A1* 10/2023 Kosaka ............ B29C 45/14336 428/192
2024/0123803 A1* 4/2024 Guellec ...................... B60J 1/10
2026/0116158 A1* 4/2026 Isings ...................... B60J 1/007

FOREIGN PATENT DOCUMENTS

DE 3612923 C2 8/1995
EP 0945296 B1 11/2003
EP 1584517 A2 * 10/2005 ............ B60R 13/07
JP 2008056178 A 3/2008

* cited by examiner

LINE B-B

LINE B-B

WINDOW ASSEMBLY AND VEHICLE

BACKGROUND

The disclosed subject matter relates generally to a vehicle. More particularly, the disclosed subject matter relates to a window assembly for a vehicle.

With rise of Battery Electric Vehicles (BEVs), design of modern automotive vehicles is also evolving. One notable trend is a desire for a seamless and flush interaction between an exterior garnish and fixed glass of a vehicle. Traditionally, this has been achieved by incorporating a flange on the exterior garnish. This flange is secured using adhesive, typically double-sided tape, that bonds the flange to the glass and then the flange to vehicle body. This approach allows for the desired seamless appearance.

However, this traditional approach relies heavily on precise placement of the adhesive tape to achieve the desired flush alignment between the garnish and the fixed glass. Any misalignment or variation in the adhesive placement during the assembly process may lead to gaps that are larger or inconsistent between the exterior garnish and the fixed glass. Such irregularities in the gap may not look visually appealing in appearance and is undesirable.

SUMMARY

In accordance with one embodiment of the present disclosure, a window assembly for a vehicle having a body panel is disclosed. The window assembly comprises at least one panel supported on the body panel of the vehicle. The at least one panel comprises a peripheral edge.

The window assembly further comprises a garnish supported on the body panel. The garnish comprises an outer surface, an inner surface opposite to the outer surface, a peripheral surface between the inner surface and the outer surface, and at least one engagement structure extending from the inner surface in a direction opposite to the outer surface. The garnish is disposed adjacent to the at least one panel, such that the garnish and the at least one panel lie in a same plane and together define a gap therebetween. The window assembly further comprises an encapsulation disposed at least partially between the at least one panel and the garnish to cover the gap therebetween. The encapsulation is fixedly coupled to the peripheral edge of the at least one panel, such that the encapsulation and the at least one panel flush with each other. The encapsulation comprises at least one slot configured to at least partially receive the corresponding at least one engagement structure of the garnish in order to couple the encapsulation and the garnish, such that the encapsulation and the garnish flush with each other.

In accordance with another embodiment of the present disclosure, a vehicle is disclosed.

The vehicle comprises a body panel and a window assembly supported on the body panel. The window assembly comprises at least one panel supported on the body panel of the vehicle. The at least one panel comprises a peripheral edge. The window assembly further comprises a garnish supported on the body panel. The garnish comprises an outer surface, an inner surface opposite to the outer surface, a peripheral surface between the inner surface and the outer surface, and at least one engagement structure extending from the inner surface in a direction opposite to the outer surface. The garnish is disposed adjacent to the at least one panel, such that the garnish and the at least one panel lie in a same plane and together define a gap therebetween. The window assembly further comprises an encapsulation disposed at least partially between the at least one panel and the garnish to cover the gap therebetween. The encapsulation is fixedly coupled to the peripheral edge of the at least one panel, such that the encapsulation and the at least one panel flush with each other. The encapsulation comprises at least one slot configured to at least partially receive the corresponding at least one engagement structure of the garnish in order to couple the encapsulation and the garnish, such that the encapsulation and the garnish flush with each other.

In accordance with yet a further embodiment of the present disclosure, a window assembly for a vehicle having a body panel is disclosed. The window assembly comprises at least one panel supported on the body panel of the vehicle. The at least one panel comprises a peripheral edge and an encapsulation fixedly coupled to the peripheral edge of the at least one panel. The encapsulation comprises at least one slot. The window assembly further comprises a garnish supported on the body panel and disposed adjacent to the at least one panel, such that the garnish and the at least one panel lie in a same plane and together define a gap therebetween.

The garnish comprises an outer surface, an inner surface opposite to the outer surface, a peripheral surface between the inner surface and the outer surface, and at least one engagement structure extending from the inner surface in a direction opposite to the outer surface. The at least one engagement structure of the garnish is configured to be at least partially received within the corresponding at least one slot of the encapsulation in order to couple the encapsulation and the garnish, such that the encapsulation and the garnish flush with each other, thereby covering the gap between the at least one panel and the garnish.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-4, wherein like numbers indicate the same or corresponding elements throughout the views.

Figure 1:
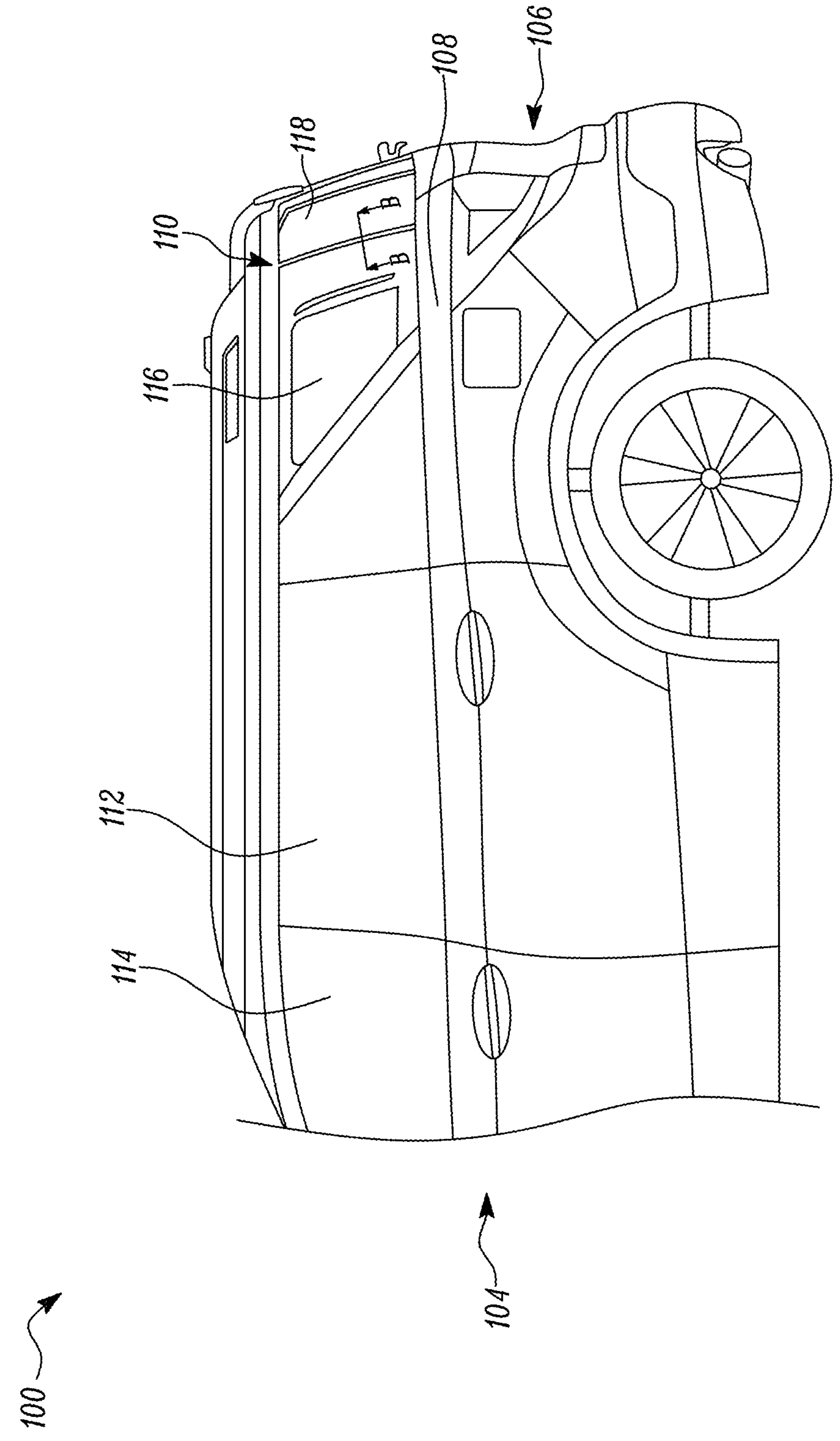
FIG. 1 is a partial side view of a vehicle comprising a window assembly, in accordance with an embodiment of the present disclosure.

FIG. 1 is a partial side view of a vehicle 100 with some components not shown for illustrative purposes, in accordance with an embodiment of the present disclosure. The vehicle 100 includes a front end 104, a rear end 106, and a body panel 108 extending longitudinally from the front end 104 to the rear end 106. Although the vehicle 100 is shown as a sport utility vehicle (SUVs) or cross over, it may be appreciated that the vehicle 100 may include any other type of vehicle, such as, but not limited to, sedan, hatchback, coupes, bus etc.

The vehicle 100 further includes a window assembly 110 supported on the body panel 108. In the illustrated embodiment of FIG. 1, as shown, the window assembly 110 is disposed proximate to the rear end 106 of the vehicle 100. Specifically, the window assembly 110 is disposed rearwardly to a rear window 112 of the vehicle 100. Moreover, in some embodiments, the window assembly 110 may be disposed proximate to rear windows of both sides of the vehicle 100. Alternatively, the window assembly 110 may be disposed proximate to the front end 104 of the vehicle 100 or a front window 114 of the vehicle 100.

The window assembly 110 includes at least one panel 116 supported on the body panel 108 of the vehicle 100. In some embodiments, the at least one panel 116 includes only one panel 116. However, in other embodiments, the at least one panel 116 may include more than one panels 116. In some embodiments, the at least one panel 116 is made of a transparent material. The window assembly 110 further includes a garnish 118 supported on the body panel 108 and disposed rearwardly to the at least one panel 116. Specifically, the garnish 118 is disposed adjacent to the at least one panel 116, such that the garnish 118 and the at least one panel 116 lie in a same plane and together define a gap 120 therebetween.

Figure 2:
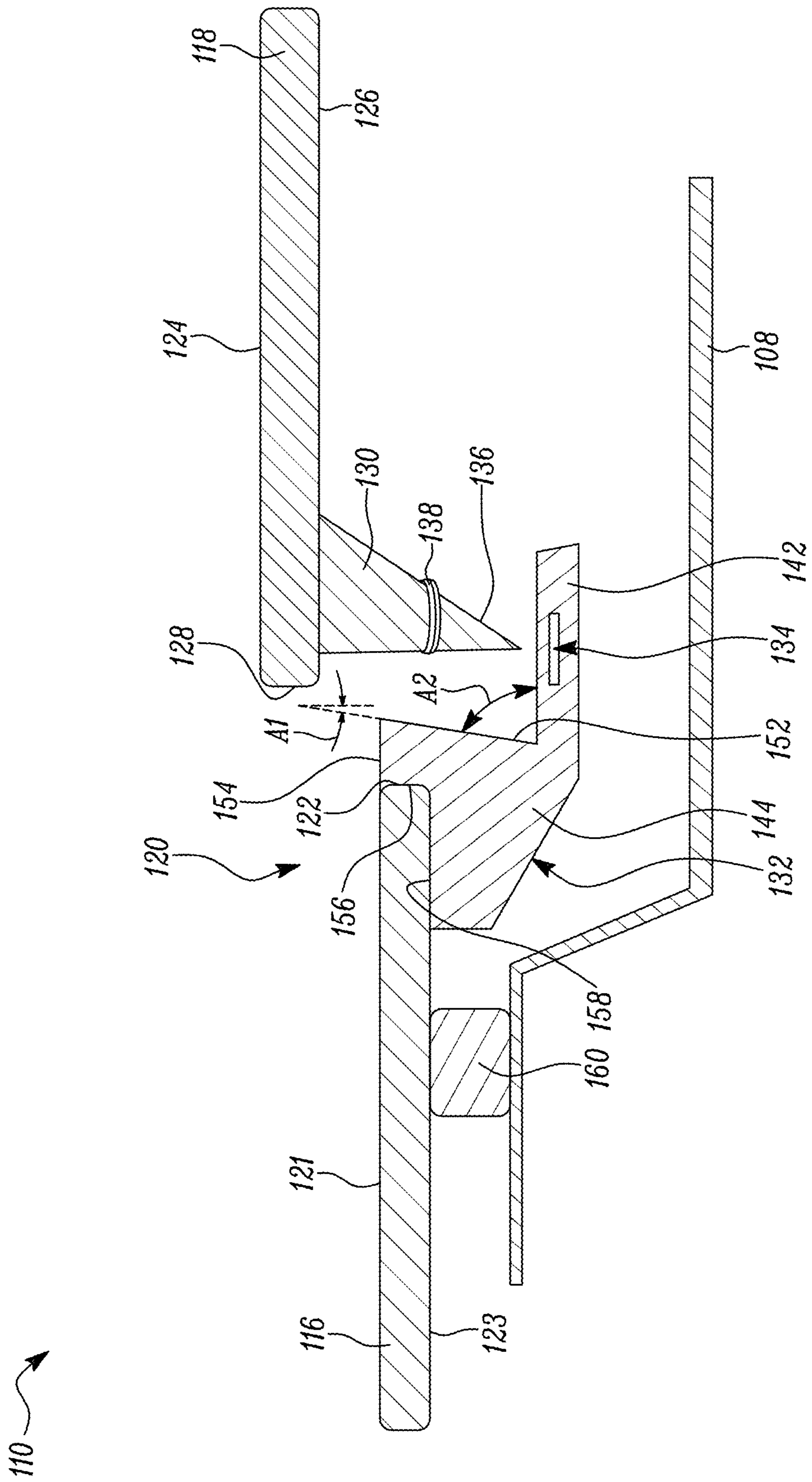
FIG. 2 is a sectional pre-assembled view of the window assembly along a line B-B shown in FIG. 1, in accordance with an embodiment of the present disclosure.
Figure 3:
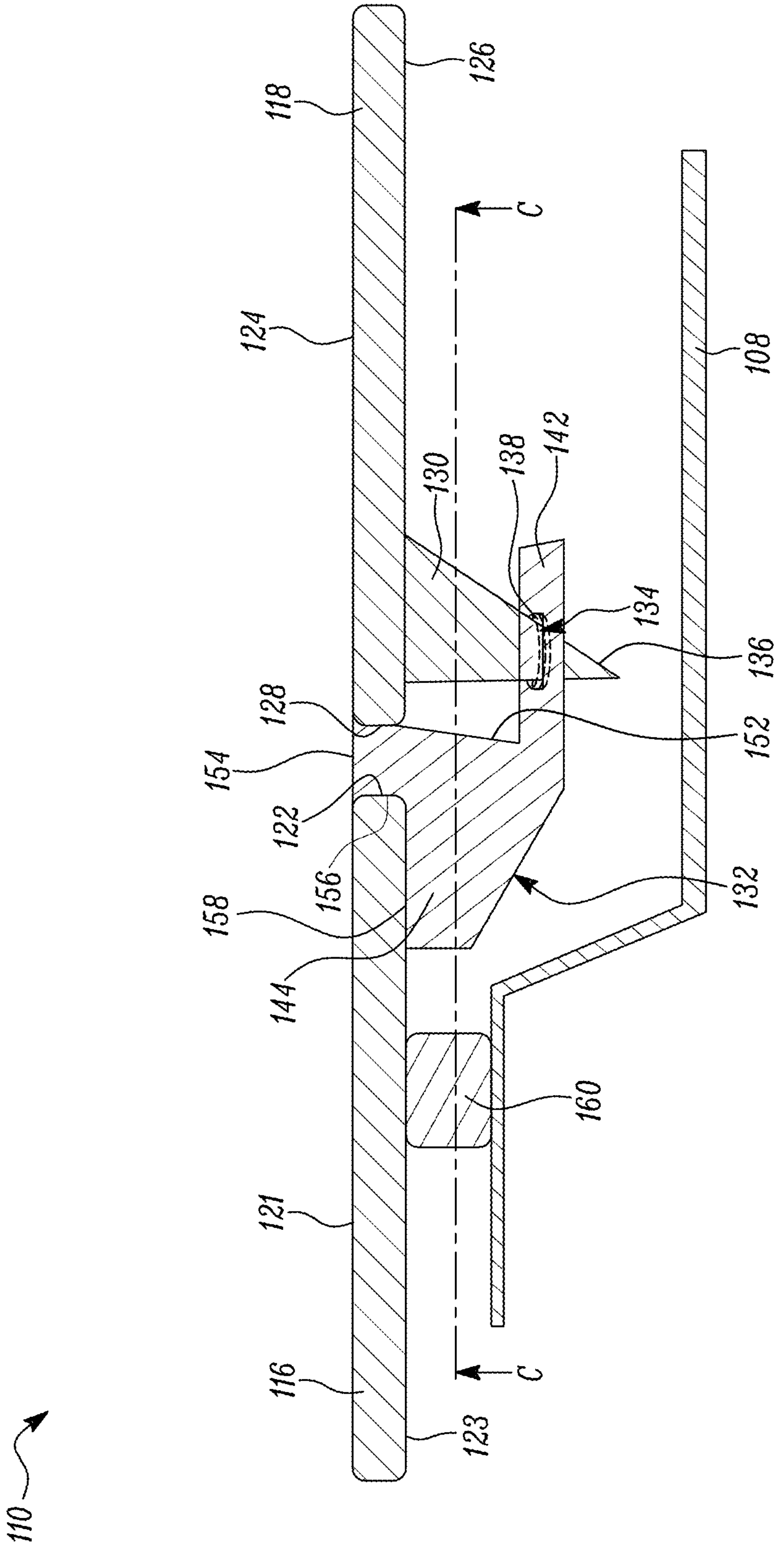
FIG. 3 is a sectional assembled view of the window assembly of FIG. 2, in accordance with an embodiment of the present disclosure.

FIG. 2 is a sectional pre-assembled view of the window assembly 110 along a line B-B shown in FIG. 1. FIG. 3 is a sectional assembled view of the window assembly 110. Referring to FIGS. 2 and 3, the at least one panel 116 includes a peripheral edge 122. The at least one panel 116 further includes an outer surface 121 and an inner surface 123 disposed opposite to the outer surface 121. Further, the garnish 118 includes an outer surface 124, an inner surface 126 opposite to the outer surface 124, and a peripheral surface 128 between the inner surface 126 and the outer surface 124. Accordingly, the gap 120 is defined between the peripheral surface 128 of the garnish 118 and the peripheral edge 122 of the at least one panel 116. The garnish 118 further includes at least one engagement structure 130 extending from the inner surface 126 in a direction opposite to the outer surface 124.

Furthermore, the window assembly 110 includes an encapsulation 132 disposed at least partially between the at least one panel 116 and the garnish 118 to cover the gap 120 therebetween. Specifically, the encapsulation 132 is fixedly coupled to the peripheral edge 122 of the at least one panel 116, such that the encapsulation 132 and the at least one panel 116 flush with each other. In some embodiments, the encapsulation 132 is integral with the at least one panel 116. Therefore, in some embodiments, the at least one panel 116 includes the encapsulation 132 that is fixedly coupled to the peripheral edge 122 of the at least one panel 116. In some embodiments, the encapsulation 132 is injection molded to the at least one panel 116 at the peripheral edge 122 thereof. In some embodiments, the encapsulation 132 is made of rubber, plastic, or a polymer material.

The encapsulation 132 includes at least one slot 134 configured to at least partially receive the corresponding at least one engagement structure 130 of the garnish 118 in order to couple the encapsulation 132 and the garnish 118, such that the encapsulation 132 and the garnish 118 flush with each other. In other words, the at least one engagement structure 130 of the garnish 118 is configured to be at least partially received within the corresponding at least one slot 134 of the encapsulation 132 in order to couple the encapsulation 132 and the garnish 118, such that the encapsulation 132 and the garnish 118 flush with each other, thereby covering the gap 120 between the at least one panel 116 and the garnish 118.

By achieving the flush interaction between the encapsulation 132 and the garnish 118, the gap 120 between the at least one panel 116 and the garnish 118 is covered. Moreover, this assembly ensures that the flush appearance between the at least one panel 116 and the garnish 118 is maintained, which may contribute to enhanced visual appeal of the vehicle 100.

Further, each of the at least one engagement structure 130 includes a locking feature 136 configured to be received within the corresponding at least one slot 134. In some embodiments, the locking feature 136 includes a stopper 138 configured to prevent a removal of the locking feature 136 upon insertion of the locking feature 136 within the at least one slot 134, thereby facilitating retention of the at least one engagement structure 130 within the at least one slot 134. The engagement of the locking feature 136 with the at least one slot 134 simplifies the assembly process of the window assembly 110 by reducing the need for highly precise placement of adhesive materials, such as double-sided tape. This allows for faster and more efficient installation, minimizing human error and the risk of misalignment during assembly.

In some embodiments, upon receiving the at least one engagement structure 130 within the corresponding at least one slot 134, the at least one engagement structure 130 is coupled to the encapsulation 132 via a snap-fit or a press fit. Further, upon receiving the at least one engagement structure 130 within the corresponding at least one slot 134, the garnish 118 moves towards the encapsulation 132 in order to facilitate flushing of the encapsulation 132 and the garnish 118. In some embodiments, the locking feature 136 has a shape of a cylinder, a cone, or a polygon. Further, the at least one slot 134 has a shape of a circle, a triangle, a rectangle, or a square.

In some embodiments, the encapsulation 132 includes a first part 142 spaced apart from the garnish 118. In some embodiments, the first part 142 may be parallel to the garnish 118. As shown, in the illustrated embodiment of FIGS. 2 and 3, the first part 142 includes the at least one slot 134. The encapsulation 132 further includes a second part 144 extending from the first part 142 at least partially towards the at least one panel 116. The second part 144 includes a first lateral surface 152. A portion of the first lateral surface 152 flush with the peripheral surface 128 of the garnish 118.

In the illustrated embodiment of FIGS. 2 and 3, the first lateral surface 152 of the second part 144 is inclined to the peripheral surface 128 of the garnish 118 at an angle A1 ranging from 1 degree to 20 degrees. In some embodiments, the angle A1 is 10 degrees. Moreover, the first lateral surface 152 of the second part 144 is inclined to the first part 142 at an angle A2 ranging from 70 degrees to 89 degrees. In some embodiments, the angle A2 is 80 degrees. In some embodiments, the first lateral surface 152 of the second part 144 may be perpendicular to the first part 142.

The second part 144 further includes an external surface 154 extending from the first lateral surface 152 towards the at least one panel 116. The second part 144 further includes a second lateral surface 156 extending from the external surface 154 towards the body panel 108. The second lateral surface 156 of the second part 144 is arranged flushing with the peripheral edge 122 of the at least one panel 116. The second part 144 further includes an internal surface 158 extending from the second lateral surface 156 away from the first lateral surface 152. The internal surface 158 of the second part 144 engages with the inner surface 123 of the at least one panel 116.

In some embodiments, the window assembly 110 further includes a support rubber 160 arranged between the at least one panel 116 and the body panel 108 to provide cushioning to the at least one panel 116 during mounting of the at least one panel 116 to the body panel 108.

Figure 4:
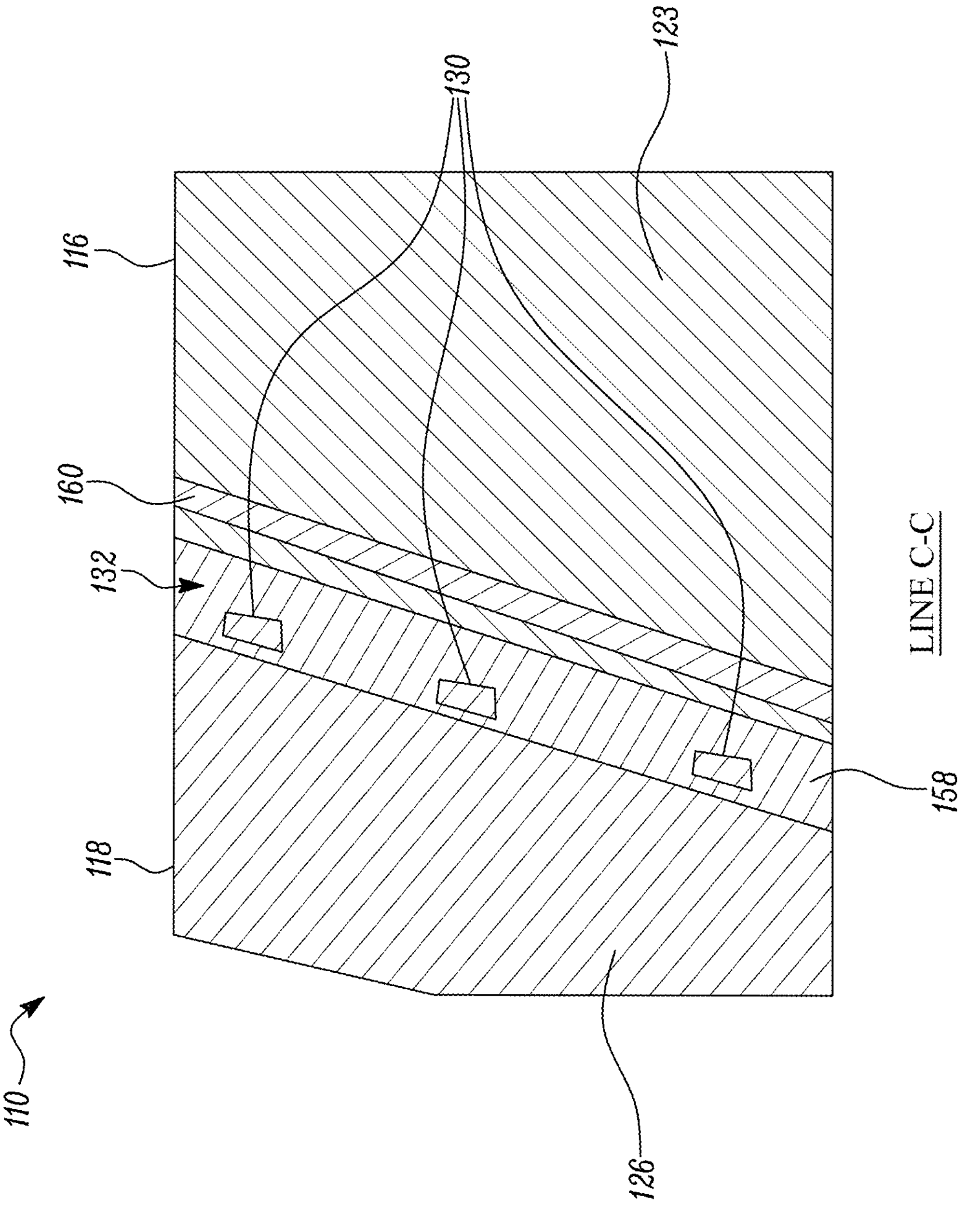
FIG. 4 is a partial cut away inside view of the window assembly along a line C-C shown in FIG. 3, in accordance with an embodiment of the present disclosure.

FIG. 4 is a partial cut away inside view of the window assembly 110 along a line C-C shown in FIG. 3, in accordance with an embodiment of the present disclosure. As shown, in some embodiments, the at least one engagement structure 130 includes a plurality of engagement structures 130 arrayed linearly such that each engagement structure 130 from the plurality of engagement structures 130 is evenly spaced apart from each other. Similarly, the at least one slot 134 includes a plurality of slots 134 disposed corresponding to the plurality of evenly spaced engagement structures 130.

The foregoing description of embodiments and examples has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the disclosure is, of course, not limited to the examples or embodiments set forth herein, but can be employed in any number of applications and equivalent devices by those of ordinary skill in the art. Rather it is hereby intended that the scope of the disclosure be defined by the claims appended hereto.

What is claimed is:

1. A window assembly for a vehicle having a body panel, the window assembly comprising:

at least one panel supported on the body panel of the vehicle and comprising a peripheral edge; and a garnish supported on the body panel and comprising an outer surface, an inner surface opposite to the outer surface, a peripheral surface between the inner surface and the outer surface, and at least one engagement structure extending from the inner surface in a direction opposite to the outer surface, the garnish disposed adjacent to the at least one panel, such that the garnish and the at least one panel lie in a same plane and together define a gap therebetween; and an encapsulation disposed at least partially between the at least one panel and the garnish to cover the gap therebetween, the encapsulation being fixedly coupled to the peripheral edge of the at least one panel, such that the encapsulation and the at least one panel flush with each other, the encapsulation comprising at least one slot configured to at least partially receive the corresponding at least one engagement structure of the garnish in order to couple the encapsulation and the garnish, such that the encapsulation and the garnish flush with each other, the encapsulation further comprising:

a first part spaced apart from the garnish and comprising the at least one slot; and a second part extending from the first part at least partially towards the at least one panel, the second part comprising:

a first lateral surface, wherein a portion of the first lateral surface is flush with the peripheral surface of the garnish;

an external surface extending from the first lateral surface towards the at least one panel;

a second lateral surface extending from the external surface towards the body panel and flushing with the peripheral edge of the at least one panel; and an internal surface extending from the second lateral surface away from the first lateral surface, wherein the internal surface of the second part engages with an inner surface of the at least one panel, wherein the first lateral surface of the second part is angled away from the peripheral surface of the garnish when moving in a direction from the external surface of the second part to the internal surface of the second part.

2. The window assembly of claim 1, wherein each of the at least one engagement structure comprises a locking feature configured to be received within the corresponding at least one slot.

3. The window assembly of claim 2, wherein the locking feature comprises a stopper configured to prevent a removal of the locking feature upon insertion of the locking feature within the at least one slot, thereby facilitating retention of the at least one engagement structure within the at least one slot.

4. The window assembly of claim 2, wherein the locking feature has a shape of a cylinder, a cone, or a polygon and the at least one slot has a shape of a circle, a triangle, a rectangle, or a square.

5. The window assembly of claim 1, wherein, upon receiving the at least one engagement structure within the corresponding at least one slot, the at least one engagement structure is coupled to the encapsulation via a snap-fit or a press fit.

6. The window assembly of claim 1, wherein, upon receiving the at least one engagement structure within the corresponding at least one slot, the garnish moves towards the encapsulation in order to facilitate flushing of the encapsulation and the garnish.

7. The window assembly of claim 1, wherein the first lateral surface of the second part is inclined to the peripheral surface of the garnish at an angle ranging from 1 degree to 20 degrees and further inclined to the first part at an angle ranging from 70 degrees to 89 degrees.

8. The window assembly of claim 1, wherein the encapsulation is integral with the at least one panel.

9. The window assembly of claim 1, wherein the encapsulation is injection molded to the at least one panel at the peripheral edge thereof.

10. The window assembly of claim 1, wherein the encapsulation is made of rubber, plastic, or a polymer material.

11. The window assembly of claim 1 further comprising a support rubber arranged between the at least one panel and the body panel to provide cushioning to the at least one panel during mounting of the at least one panel to the body panel.

12. The window assembly of claim 1, wherein:

the at least one engagement structure comprises a plurality of engagement structures arrayed linearly such that each engagement structure from the plurality of engagement structures is evenly spaced apart from each other; and the at least one slot comprises a plurality of slots disposed corresponding to the plurality of evenly spaced engagement structures.

13. The window assembly of claim 1, wherein the at least one panel is made of a transparent material.

14. A vehicle, comprising:

a body panel; and a window assembly supported on the body panel, the window assembly comprising:

at least one panel supported on the body panel of the vehicle and comprising a peripheral edge; and a garnish supported on the body panel and comprising an outer surface, an inner surface opposite to the outer surface, a peripheral surface between the inner surface and the outer surface, and at least one engagement structure extending from the inner surface in a direction opposite to the outer surface, the garnish disposed adjacent to the at least one panel, such that the garnish and the at least one panel lie in a same plane and together define a gap therebetween; and an encapsulation disposed at least partially between the at least one panel and the garnish to cover the gap therebetween, the encapsulation being fixedly coupled to the peripheral edge of the at least one panel, such that the encapsulation and the at least one panel flush with each other, the encapsulation comprising at least one slot configured to at least partially receive the corresponding at least one engagement structure of the garnish in order to couple the encapsulation and the garnish, such that the encapsulation and the garnish flush with each other, the encapsulation further comprising:

a first part spaced apart from the garnish and comprising the at least one slot; and a second part extending from the first part at least partially towards the at least one panel, the second part comprising:

a first lateral surface, wherein a portion of the first lateral surface is flush with the peripheral surface of the garnish;

an external surface extending from the first lateral surface towards the at least one panel;

a second lateral surface extending from the external surface towards the body panel and flushing with the peripheral edge of the at least one panel; and an internal surface extending from the second lateral surface away from the first lateral surface, wherein the internal surface of the second part engages with an inner surface of the at least one panel, wherein the first lateral surface of the second part is angled away from the peripheral surface of the garnish when moving in a direction from the external surface of the second part to the internal surface of the second part.

15. A window assembly for a vehicle having a body panel, the window assembly comprising:

at least one panel supported on the body panel of the vehicle, the at least one panel comprising a peripheral edge and an encapsulation fixedly coupled to the peripheral edge of the at least one panel, the encapsulation comprising at least one slot; and a garnish supported on the body panel and disposed adjacent to the at least one panel, such that the garnish and the at least one panel lie in a same plane and together define a gap therebetween, the garnish comprising an outer surface, an inner surface opposite to the outer surface, a peripheral surface between the inner surface and the outer surface, and at least one engagement structure extending from the inner surface in a direction opposite to the outer surface;

wherein the at least one engagement structure of the garnish is configured to be at least partially received within the corresponding at least one slot of the encapsulation in order to couple the encapsulation and the garnish, such that the encapsulation and the garnish flush with each other, thereby covering the gap between the at least one panel and the garnish, the encapsulation further comprising:

a first part spaced apart from the garnish and comprising the at least one slot; and a second part extending from the first part at least partially towards the at least one panel, the second part comprising:

a first lateral surface, wherein a portion of the first lateral surface is flush with the peripheral surface of the garnish;

an external surface extending from the first lateral surface towards the at least one panel;

a second lateral surface extending from the external surface towards the body panel and flushing with the peripheral edge of the at least one panel; and an internal surface extending from the second lateral surface away from the first lateral surface, wherein the internal surface of the second part engages with an inner surface of the at least one panel, wherein the first lateral surface of the second part is angled away from the peripheral surface of the garnish when moving in a direction from the external surface of the second part to the internal surface of the second part.

* * * * *